Oct. 24, 1967   W. B. ZERN   3,348,870
SLIDE FASTENER ACTUATING DEVICES
Filed Aug. 24, 1965   4 Sheets-Sheet 1

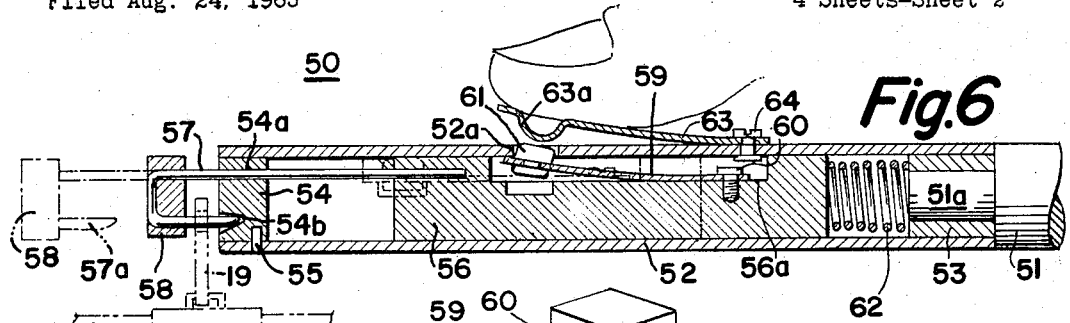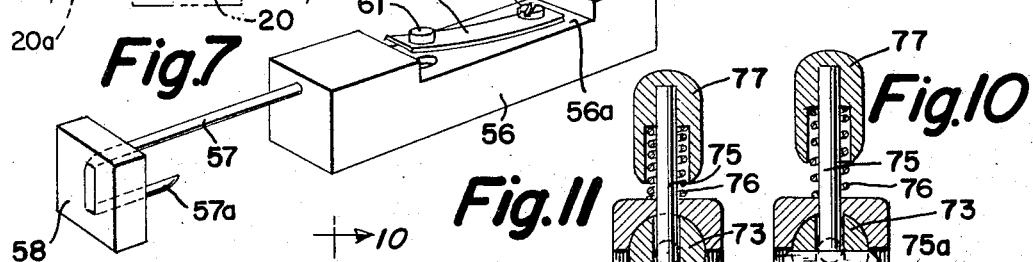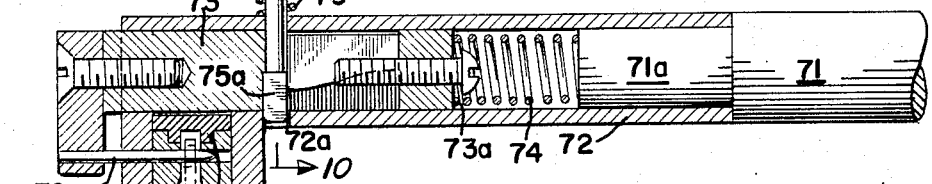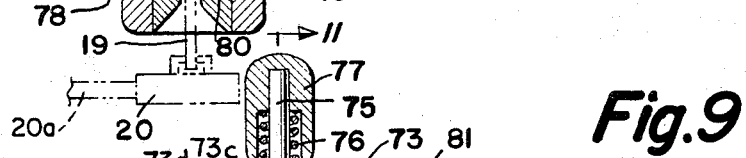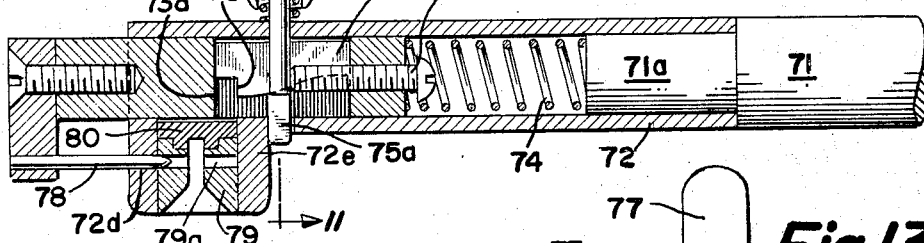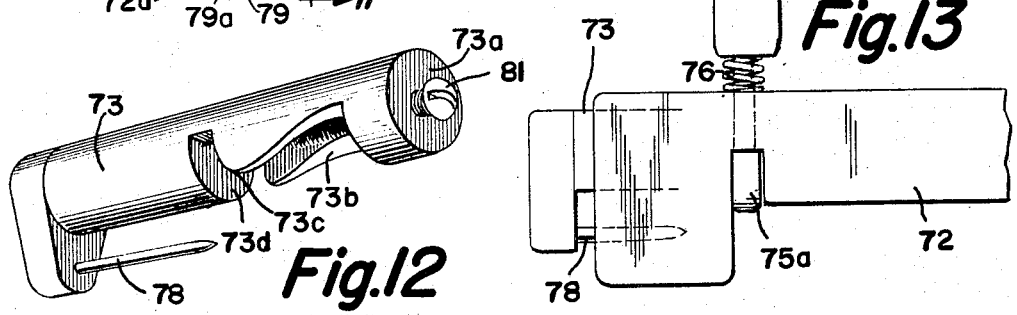

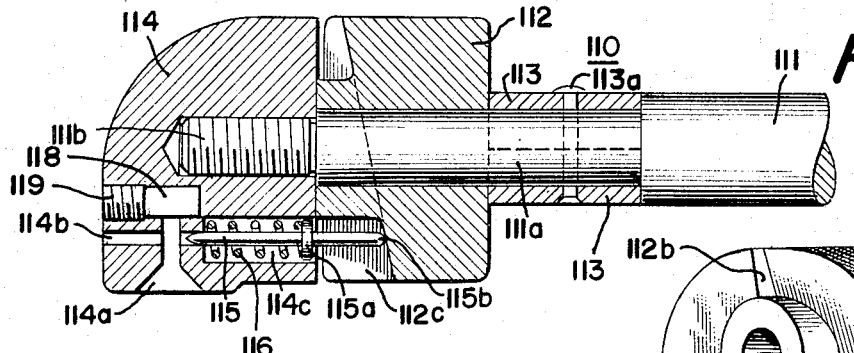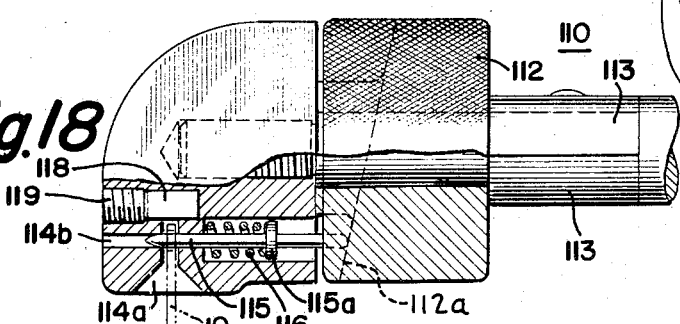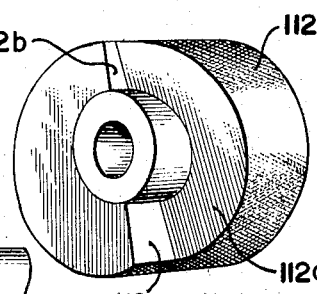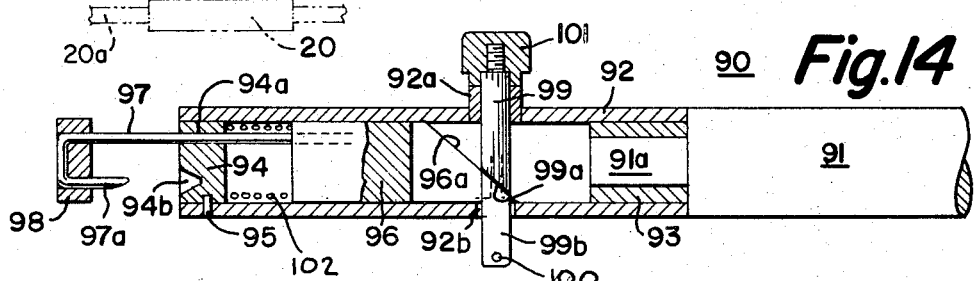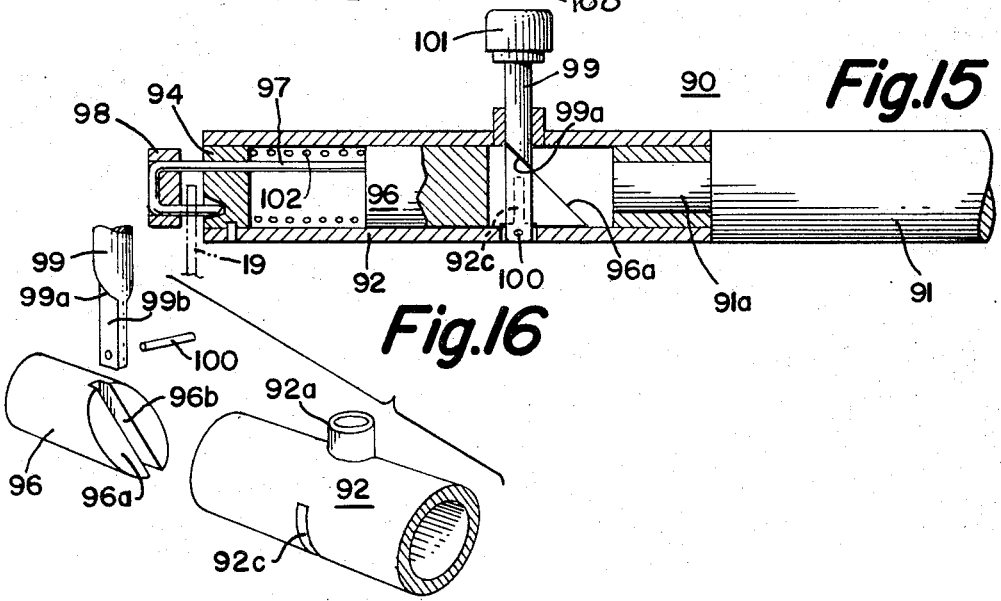

Oct. 24, 1967  W. B. ZERN  3,348,870
SLIDE FASTENER ACTUATING DEVICES
Filed Aug. 24, 1965  4 Sheets-Sheet 4

United States Patent Office 3,348,870
Patented Oct. 24, 1967

3,348,870
SLIDE FASTENER ACTUATING DEVICES
Warren B. Zern, 1016 N. Evans and Mineral Sts.,
Pottstown, Pa. 19464
Filed Aug. 24, 1965, Ser. No. 482,087
9 Claims. (Cl. 294—19)

This application is a continuation-in-part of my application Ser. No. 470,412, filed July 8, 1965, and is an improvement on my invention disclosed in my copending application Ser. No. 464,623, filed June 17, 1965, issued Oct. 11, 1966, as Patent No. 3,278,215.

This invention relates to actuating devices for zippers and the like, and has for an object the provision of improved slide fastener actuating devices.

It is quite customary today to provide women's clothing, such as dresses and bathing suits, with mechanical closures in the form of "zippers" which are located on the back of the clothing. Such zippers are of substantial length often extending from the neck to the waist of the garment. The zippers are frequently difficult to operate by reason of their location and the difficulty of operation becomes increased when the slide fastener becomes stuck. It is not unusual for a slide fastener to become stuck when a loose thread or a piece of the fabric becomes caught in the slide fastener. Under such circumstances, it becomes necessary to apply a greater force to the slide fastener than normally used, and such force may need to be either in the direction of opening or closing the fastener as may be required to break the slide fastener loose from its stuck position.

Many slide fastener actuating devices have been proposed heretofore. However, they have left something to be desired. For example, the slide fastener actuating devices of the pull string type only permit operation of the device in one direction and, thus, are not suitable for push and pull operation as is normally required to break a stuck fastener loose. While other slide fasteners have been proposed with rigid or semi-rigid handles, their attachment devices to the zipper tab have not been of sufficiently positive construction to enable the operator to firmly pull the zipper or push the zipper as may be required to free the zipper when it is in stuck condition.

My aforesaid copending application Ser. No. 464,623 discloses a slide fastener actuating device which eliminates the foregoing problems; nevertheless it is necessary that the operator maintain the handle in a particular position relative to its longitudinal axis in order to avoid dislodging the zipper fastener from the end thereof prior to completion of the zipper opening or closing operation. The present invention eliminates this requirement by providing adjustable means for locking the slide fastener to the actuating device and wherein the adjustable locking means is of rugged construction so that it will not be accidentally disengaged from the slide fastener but at the same time is easily locked or unlocked by the operator as required.

In accordance with the present invention, there is provided a device for actuating a slide fastener of the type having a pull tab with an opening therein. Such device comprises a handle of rod-like construction having pin structure movably carried at one end of the handle and extending longitudinally thereof. The pin structure has a diameter sufficiently small to extend through the opening in the slide fastener tab. Structure is carried by the device at one end of the handle to form an open end slot extending transversely of the pin structure. The slot is constructed and arranged to receive the slide fastener tab while it is positioned on the pin structure and to cooperate with the pin structure in maintaining the slide fastener tab substantially perpendicular to the longitudinal axis of the handle during both push and pull longitudinal movements of the handle. The device also includes spring means acting on the movably carried pin structure to releasably lock the slide fastener tab in the slot.

In accordance with another aspect of the invention, a permanent magnet is carried by the device and associated with the closed end of the slot to aid in drawing the slide fastener tab through the open end of the slot.

In accordance with a further aspect of the invention, the open end slot is positioned to one side of the longitudinal axis of the handle and the pin structure extends through the slot intermediate the open and closed ends thereof.

For further objects and advantages of the invention, reference is to be had to the following description taken in conjunction with the accompanying drawings in which:

FIG. 6 is an elevational view partly in section of another modification of the invention;

Figure 20:
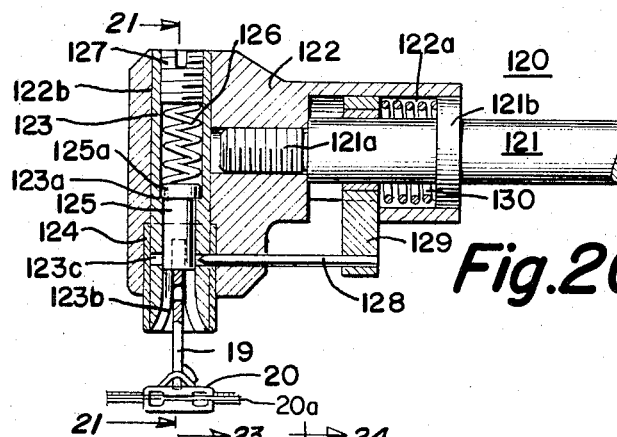
Figure 21:
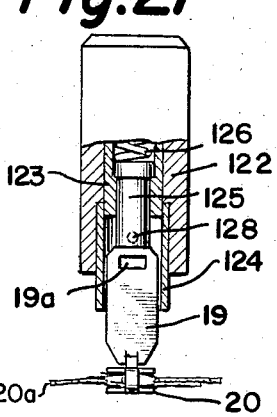
Figure 22:
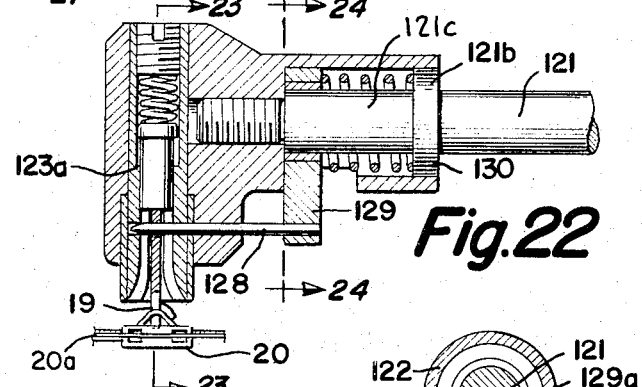
Figure 23:
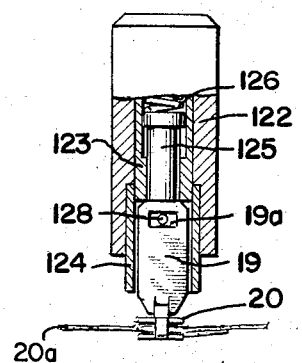
Figure 24:
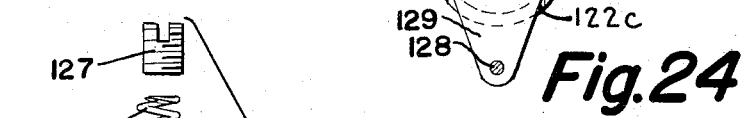

FIG 7. is a perspective view of the slide member of the modification shown in FIG. 6;

FIG. 8 is an elevational view partly in section of a further modification of the invention and including a permanent magnet;

FIG. 9 is a view similar to FIG. 8 but with the device in open position;

FIG. 10 is a cross-sectional view taken along the plane 10—10 in FIG. 8;

FIG. 11 is a cross-sectional view taken along the plane 11—11 in FIG. 9;

FIG. 12 is a perspective view of the slide member of the modification shown in FIGS. 8 and 9;

FIG. 13 is a fractional elevational view of the modification shown in FIG. 8;

FIG. 14 is an elevational view partly in section of another modification of the invention;

FIG. 15 is a view similar to FIG. 14 but with the device in closed or locked position;

FIG. 16 is an exploded perspective view of the slide member and associated parts of the modification shown in FIGS. 14 and 15;

FIG. 17 is an elevational view partly in section of a further modification of the invention with the device shown in open position;

FIG. 18 is a view similar to FIG. 17 but with the device in closed or locked position;

FIG. 19 is a perspective view of the pin actuator shown in FIGS. 17 and 18;

FIG. 20 is an elevational view partly in section of a further modification of the invention;

FIG. 21 is a cross-sectional view taken along the plane 21—21 in FIG. 20;

FIG. 22 is a view similar to FIG. 20 but with the device in closed or locked position;

FIG. 23 is a cross-sectional view taken along the plane 23—23 in FIG. 22;

FIG. 24 is a cross-sectional view taken along the plane 24—24 in FIG. 22; and

Figure 25:
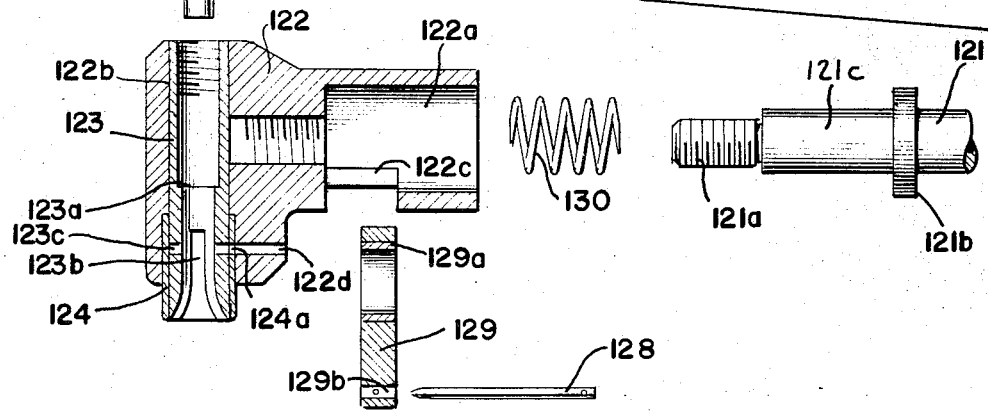

FIG. 25 is an exploded view in section of the modification shown in assembled relation in FIGS. 20 and 22.

Referring to FIGS. 1–4, there is illustrated a slide fastener actuating device 10 embodying the preferred form of the invention. The device 10 is provided with a handle 11 of rigid or semi-rigid rod-like construction.

The handle 11 may be made of metal, wood, plastic or other suitable material. One end of the handle 11 is provided with an extension of reduced diameter 11a on which is adapted to be secured a tubular member 12. A sleeve 13 has been shown in FIGS. 1–3 to aid in holding the tubular member 12 on the extension 11a. It is to be understood that a portion 11a may be of larger diameter and the sleeve 13 omitted if desired. The member 12 is hollow and serves as an extension of the handle 11. The outer end of the tubular member 12 is provided with a plug or end member 14 having a pair of longitudinal passages 14a and 14b. The plug 14 is adapted to be secured in the end of the tubular member 12 as by a pin or screw 15. Positioned within the tubular member 12 is a slide member 16 which may best be seen in FIG. 4. The slide member is provided at one end with a pin means or wire member 17 shaped in the form of a hook. The hook-shaped end of the wire member 17 is provided with a button member 18 having a pair of openings through which the wire member 17 extends. The return end portion 17a of the wire member 17 is adapted to extend through the opening 19a in the slide fastener tab 19 of the slide fastener 20. A conventional zipper 20a which comprises the usual pair of interlocking teeth carried by tapes which are sewed to the fabric of the garment has been illustrated in FIG. 1. The zipper 20a and the slide fastener 20 are of well known conventional construction, and, thus, no further explanation of them is believed necessary.

The opposite end of the slide member 16 is provided with a cam surface 16a which is adapted to engage a corresponding cam surface 21a on a member 21 which is also disposed in the tubular member 12. The member 21 is biased toward the outer end of the tubular member 12 by means of a compression spring 22 which abuts the sleeve 13 and the adjacent end 21b of slidable member 21.

Figure 1:
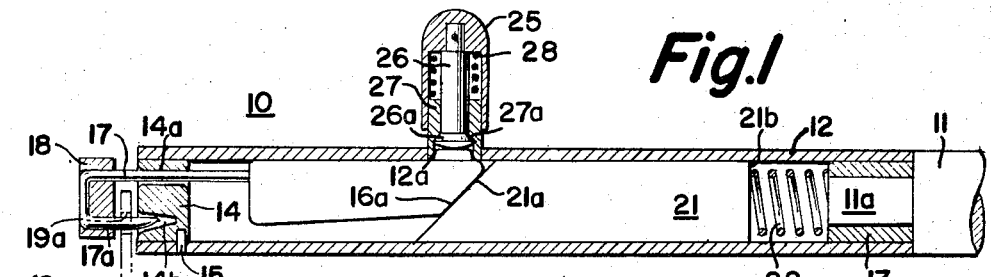
FIG. 1 is an elevational view partly in section of a slide-fastener actuating device embodying the invention.
Figure 2:
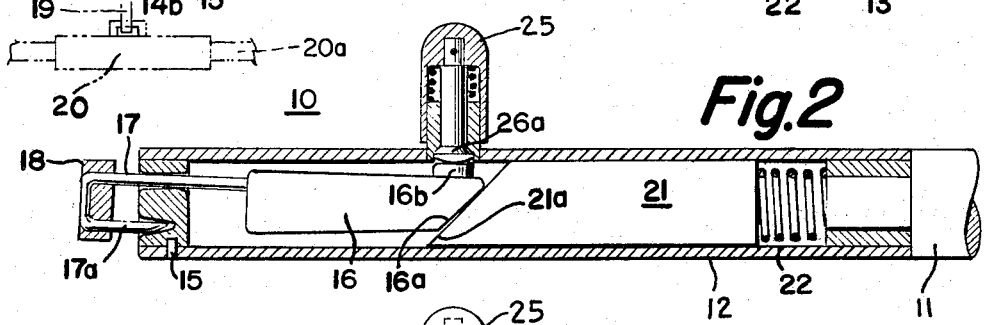
FIG. 2 is a view similar to FIG. 1 but with the parts in position preparatory to moving to open position.
Figure 3:
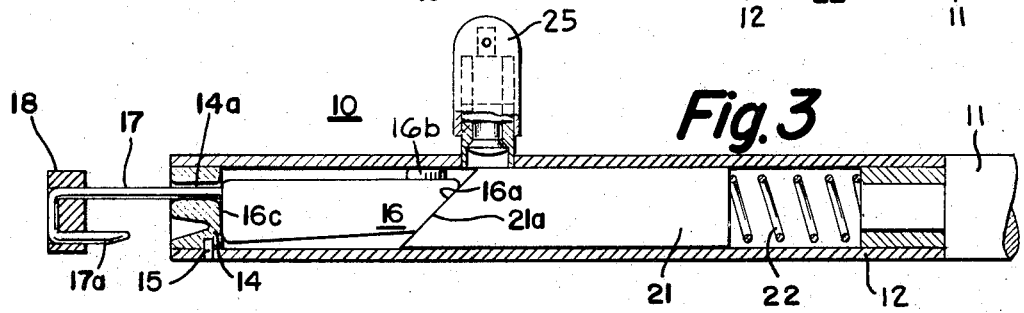
FIG. 3 is a view similar to FIGS. 1 and 2 but with the device in open position.

The slide member 16 is also provided with a projection or extension 16b at one side thereof which is adapted to extend through an opening in the side wall of the tubular member 12, as shown in FIG. 1. Associated with the opening 12a and mounted on the tubular member 12 is an actuator button 25. The actuator button 25 includes a plunger 26 which is secured thereto at one end and the opposite end is provided with an enlarged portion 26a which is adapted to extend through a sleeve 27 which is mounted in the opening 12a in tubular member 12. The sleeve 27 includes a shoulder 27a which engages the enlarged portion 26a on the plunger 26 and limits the outward movement thereof by the compression spring 28 confined within the button 25 and the outer end of the sleeve 27. As may be seen in FIG. 1, the slide fastener actuator device 10 is in closed or locked position with regard to the slide fastener tab 19. The slide fastener is held between the members 14 and 18 which cooperate to form slot structure which extends transversely of the pin 17a. The extension 16b on the slide member 16, as shown in FIG. 1, extends into the lower end of the sleeve 27 and into engagement with the enlarged end 26a of plunger 26. The compression spring 22 in the tubular member 12 applies a longitudinal force to the end 21b of member 21 which in turn applies a longitudinal force to the slide member 16 by way of cam surfaces 21a and 16a to hold the extension 16b against the end of the sleeve 27. This maintains the device 10 in locked position as shown in FIG. 1. To release the slide fastener tab 19 from the device 10, the button 25 is pressed downwardly, as shown in FIG. 2, thereby compressing the spring 28 and causing the plunger 26 to move the extension 16b on slide member 16 out of engagement with the sleeve 27. This causes the cam surface 16a at the rear end of slide member 16 to move down the cam surface 21a on member 21. When the extension 16b is moved out of engagement with the sleeve 27 in the opening 12a in tubular member 12, the compression spring 22 is effective to move the member 21 to the left, as shown in FIG. 2, until it reaches the position shown in FIG. 3. At this time the forward end 16c of the slide member 16 has moved into engagement with the plug 14 and the pin 17a has been disengaged with respect to the opening 19a in the slide fastener tab 19 of the zipper 20a.

Figure 4:
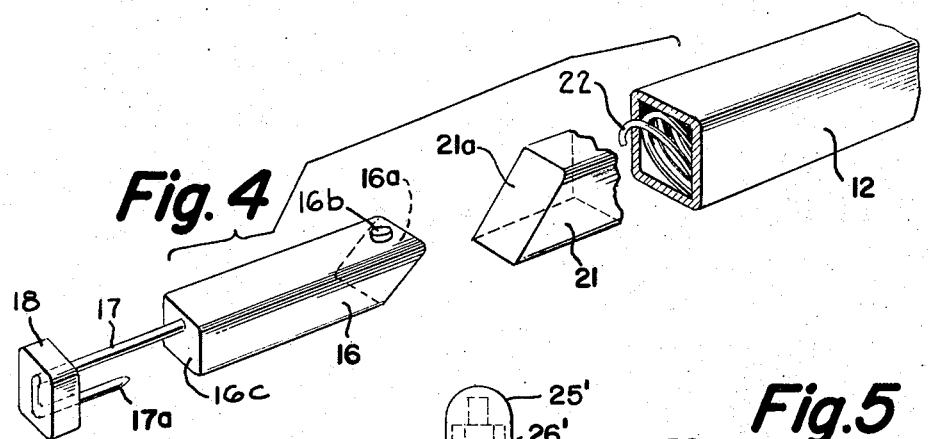
FIG. 4 is an exploded perspective view of the device shown in FIGS. 1–3.

To close the actuator device 10 on the slide fastener tab 19 again, it is only necessary to press on the button 18 and thereby compress the spring 22 until the extension 16b on slide member 16 has moved to the left a sufficient distance to be re-inserted in the lower end of sleeve 27, as shown in FIG. 1. The members 12, 16 and 21 preferably are rectangular in cross section, as shown in FIG. 4, so as to maintain the cam surfaces 16a and 21a in proper alignment, and thus, insure that the pin 17a does not turn so that it cannot re-enter the passage 14b in the plug 14. It is to be understood, however, that the members 16, 21, and 12 may be circular in cross section if desired and a pin inserted in the slide member 16 to extend through a longitudinal slot in tubular member 12 to prevent relative rotation between the parts. It is also to be understood that the members 12, 16 and 21 may be made of any suitable material, such as metal or plastic.

Figure 5:
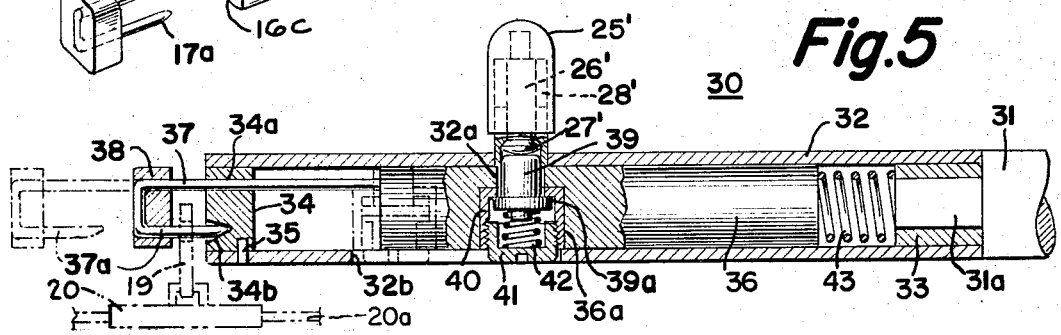
FIG. 5 is an elevational view partly in section of a modification of the invention.

Referring to FIG. 5, there is shown a modification of the invention. The slide fastener actuating device 30 is provided with a handle 31 of rigid or semi-rigid rod-like construction. The handle 31 may be made of any suitable material, as mentioned above in connection with handle 11. A tubular member 32 similar to member 12 is mounted on the end 31a of handle 31. A sleeve 33 is adapted to aid in securing the tubular member 32 to the handle 31. The outer end of the tubular member 32 is provided with a plug 34 having a pair of longitudinal passages 34a and 34b therein. The plug 34 is adapted to be secured to the end of tube 32 by a pin or screw member 35.

A slide member 36 is disposed within the tubular member 32 and corresponds to the slide member 16 described above in connection with FIGS. 1–4. The slide member 36 is provided with a hook-shaped wire 37 which extends through a pair of openings in a button member 38. The end 37a of the hook member 37 acts as a pin and is adapted to extend through the opening in a slide fastener. The device 30 has been shown in closed or locked position, and, thus, the members 34 and 38 cooperate to form transverse slot structure through which the pin 37a extends to lock the slide fastener on the device 30 similar to the device 10 illustrated in FIG. 1.

The slide member 36 is provided with an extension 39 which is adapted to extend into an opening 32a in the side wall of the tubular member 32. The opening 32a is provided with an actuator button 25' similar to the actuator button 25 previously described and, thus, the corresponding parts thereof have been identified by corresponding reference characters with the addition of a prime. Thus, it is believed that it is not necessary to repeat the description of the construction of the actuator button 25'. The extension 39 is disposed within a chamber 36a within the slide member 36. The chamber 36a is provided with a liner 40 within which the extension 39 is adapted to reciprocate. The outer end of the liner 40 preferably is threaded and adapted to engage the threads on the cap member 41 which retains a compression spring 42 in engagement with the enlarged end 39a of extension 39. The spring 42 is adapted to bias the extension 39 to its outer position, as shown in FIG. 5. To release the device 30 from its full-line position shown in FIG. 5 to its phantom-line position, the actuator button 25' is compressed, causing the plunger 26' therein to move downwardly and compress the spring 28' and cause the extension 39 to move downwardly against the bias of spring 42. This moves the extension 39 out of engagement with the sleeve 27' within the opening 32a, thereby permitting the compression spring 43 within the tubular member 32 to move the slide member 36 to the left until the member 41 reaches the end of the slot 32b in tubular member 32. At this time the pin member 37a will have moved to the phantom-line position, shown in FIG. 5, and out of the passage 34b, thereby releasing the slide fastener with respect to the device 30.

From the foregoing description, it will be seen that the essential differences between the modification shown in FIG. 5 and the embodiments shown in FIGS. 1–4 reside in the construction of the slide member 36.

Referring to FIGS. 6 and 7, there is shown a slide fastener actuator device embodying a further modification of the invention. The slide fastener actuating device 50 is provided with a handle 51 of rigid or semi-rigid rod-like construction. The handle 51 may be made of any suitable material as mentioned above. Secured to the end 51a of handle 51, as by sleeve 53, is a tubular member 52. The tubular member 52 is similar to tubular member 12 described above in FIGS. 1–4, and the outer end of tubular member 52 is provided with a plug 54 having longitudinal passages 54a and 54b and held in place by a pin 55. Disposed within the tubular member 52 is a slide member 56 which has secured to one end thereof a hook-shaped wire 57. The hook end of the wire 57 extends through passages in a button member 58, and the pin end 57a of the wire 57 is adapted to extend into the passage 54b when the device 50 is in closed position as shown in full-line in FIG. 6.

As in the previous modifications, the slide fastener tab is adapted to have the pin 57a extend through the opening therein and the members 58 and 54 cooperate to form slot structure through which the pin 57a extends to lock the slide fastener tab to the device 50 and perpendicular to the axis of the device. The slide member 56 is provided with a recess 56a within which is disposed a leaf spring member 59. One end of the leaf spring member 59 is secured to the slide member 56 as by a screw 60, and the opposite end of the spring member 59 is provided with an extension 61 which is adapted to extend through an opening 52a in the side wall of tubular member 52. A compression spring 62 similar to compression spring 22 in FIGS. 1–4 is adapted to abut the rear end of the slide member 52 and the adjacent end of the handle 51. When the parts are in the position shown in full line in FIG. 6, the device 50 is in closed or locked position. In such position, the compression spring 62 is compressed and the extension 61 on the spring 59 extends into the opening 52a, preventing the spring 62 from moving the slide member 56 into engagement with the plug member 54.

To release the slide fastener from the device 50, the operator depresses a leaf spring member 63 which is secured at 64 to the outside of the tubular member 52 and the curved portion 63a is adapted to force the extension 61 into the tube 52 and out of the opening 52a. This permits the compression spring 52 to force the slide member 56 to the left, as shown in FIG. 6, bringing the end of member 56 into engagement with the plug 54 and moving the button 58 and pin 57a to the phantom-line position shown in FIG. 6.

As may be seen in FIG. 7, the slide member 56 preferably is rectangular in cross section and the tubular member 52 likewise is preferably rectangular in cross section so as to maintain the pin 57a in alignment with its cooperating passage 54b in plug 54. However, as pointed out above in connection with FIGS. 1–4, the members 52 and 56 may be circular in cross section and a pin inserted in the slide member 56 to extend through a longitudinal slot in the tubular member 52 to maintain the proper alignment of member 56.

Referring to FIGS. 8–13, there is illustrated a further modification of the invention. The slide fastener actuating device 70 is provided with a handle 71 of rigid or semi-rigid rod-like construction. The handle 71 may be made of any suitable material as mentioned above. The handle 71 is provided with an extension 71a of reduced diameter to which is adapted to be secured a tubular member 72.

Positioned within the tubular member 72 is a slide member 73 which may best be seen in FIG. 12. The slide member 73 is adapted to be maintained in the locked position shown in FIG. 8 by means of a compression spring 74 contained within the sleeve 72. The compression spring 74 is adapted to abut the end 71a of handle 71 and the adjacent end 73a of the slide member 73.

As may be seen in FIG. 12, the slide member 76 is provided with a sloping or inclined cam surface 73b which is inclined from the outer end of a shoulder 73c of the slide member 73 toward the end 73a. As may be seen in FIG. 8, the compression spring 74 is adapted to maintain the shoulder 73c against the enlarged head 75a of a lock or cross pin 75 which extends transversely of the longitudinal axis of the device 70. The head 75a is adapted to extend into a slot 72a in the sleeve 72, as may be seen in FIGS. 8 and 9. The end of the cross pin 75 opposite the head 75a thereof is provided with a compression spring 76. As may be seen in FIGS. 8–11, the compression spring 76 is adapted to engage the outer surface of the sleeve 72 while the opposite end of the spring 76 is adapted to be received within a cup-shaped member 77 which is secured to the upper end of cross pin 75. With this construction, it will be seen that the spring 76 maintains the head 75a within the slot formed by the shoulder 73c and shoulder 73d, FIG. 12.

The outer end of the slide member 73 is provided with a pin means or wire member 78. The pin 78 is adapted to extend through the opening 19a in the slide fastener tab 19 of the zipper 20a. The pin 78 is also adapted to extend through a passage 72d in a transverse section 72e of the tube 72. The transverse section 72e is provided with a liner 79 at the rear of which is disposed a permanent magnet 80. The permanent magnet 80 is adapted to draw the slide fastener tab 19 into the open end slot formed by two sides of the liner 79 to bring the opening 19a in the slide fastener tab 19 into alignment with the pin 78. The liner 79 is provided with a passage 79a which is in alignment with the passage 72d, and, thus, is adapted to receive the pin 78.

When the device 70 is in closed or locked position, as shown in FIGS. 8 and 13, the cross pin 75 will be in the position shown in FIG. 10. To release the slide fastener tab 19 from the device 70, the cross pin 75 is pressed downwardly to compress the spring 76 and cause the head 75a to move outwardly of the slot 72a and move the head 75a out of engagement with the shoulder 73c. This permits the compression spring 74 to move the slide member 73 to the left, as viewed in FIG. 8, until it reaches the open position shown in FIG. 9. At this time the cross pin 75 is in the position shown in FIG. 11 with the enlarged head 75a engaging the cam surface 73b on the slide member 73.

To prevent the spring 74 from pushing the slide member 73 completely out of the tubular member 72, the slide member 73 is provided with a stop 81, FIG. 9, which is adapted to engage the cross pin 75 when the device 70 is in the open position. The stop 81 may be a separate member, as illustrated by the screw 81, carried by member 73, or the stop may comprise a shoulder integral with the member 73. The screw member 81 permits the position of the stop to be adjusted and, thus, varies the outer position, or open position, of the device 70. The tubular member 72, including the transverse section thereof 72e and the slide member 73, may be made of any suitable material such as metal or plastic. The liner 79 likewise may be made of any suitable material such as metal or plastic. However, if it is made of metal, it should be non-magnetic so as to permit the permanent magnet 80 to draw the slide fastener tab 19 completely into the slot where it will be engaged by the pin 78 carried by member 73.

Referring to FIGS. 14 and 15, there is shown another modification of the invention. The slide fastener actuating device 90 is provided with a handle 91 of rigid or semi-rigid rod-like construction. The handle 91 may be made of any suitable material as mentioned above. A tubular member 92 is mounted on the end 91a of the handle 91 by means of a sleeve 93. The outer end of the tubular member 92 is provided with a plug 94 having a pair of longitudinal passages 94a and 94b. The plug 94 is adapted to be secured to the end of tube 92 by a pin or screw member 95. A slide member 96 is disposed within the tubular member 92. The slide member 96 is provided with a hook-shaped wire 97 which extends through a pair of openings in a button member 98. The end 97a of the hook member 97 acts as a pin and is adapted to extend through the opening in the slide fastener. The rear end of the slide member 96 is provided with an inclined cam surface 96a which is adapted to be engaged by a mating inclined cam surface 99a on a cross pin 99. The cross pin 99 is adapted to have its upper end extend through an opening 92a in the side wall of the tubular member 92, while the lower end 99b of the cross pin 99 is adapted to extend through a longitudinal slot 92b in the tubular member 92. The lower end 99b of cross pin 99 is flattened, as indicated in FIG. 16, and this end is adapted to extend through the slot 96b which extends through the cam surface 96a. The lower end of portion 99b is provided with an opening through which extends a lock pin 100. The upper end of cross pin 99 has secured thereto an operating button 101.

A compression spring 102 is positioned within the tubular member 92 and engages the forward end of the slide member 96 and the adjacent end of the plug member 94. When the device 90 is in its normal position, as shown in FIG. 15, the spring 102 is effective to hold the pin 97a within the opening 94b. This is the closed position for the device 90. At this time, the cam surface 96a on member 96 engages the cooperating cam surface 99a on the cross pin 99, causing the latter to move to its upper position shown in FIG. 15. At this time, the lock pin 100 has been moved upwardly into the cross slot 92c in the lower side of the tubular member 92.

To open the device 90 so that a slide fastener tab may be inserted or withdrawn from the pin 97a, the operator presses the button 101, causing the cross pin 99 to move downwardly to the position shown in FIG. 14. During this operation, the cam surface 99a slides down the cooperating cam surface 96a on slide member 96, forcing the latter to the left until it reaches the position shown in FIG. 14. At this time, the compression spring 102 is placed under compression. Thus, when the button 101 is released, the spring 102 is effective to move the parts from the position shown in FIG. 14 to the closed position shown in FIG. 15.

The flat end 99b of cross pin 99 is positioned within the slot 96b in slide member 96, and, thus, prevents the latter from rotating during operation of the device 90. This insures that the pin 97a will remain in alignment with the transverse opening 94b. As mentioned in connection with the previous modification, the various parts of the device 90 may be made from suitable materials such as metal or plastic.

Referring to FIGS. 17–19, there is shown a further modification of the invention. The slide fastener device 110, shown in FIGS. 17 and 18, is provided with a handle 111 of rigid or semi-rigid rod-like construction. The handle 111 may be made of any suitable material as mentioned above. A tubular member 112 is mounted on an end 111a of reduced diameter on handle 111. The tubular member 112 is positioned between a split sleeve 113, which is secured to the handle 111 as by a rivet 113a, and an end member 114 which is secured to the extreme end 111b of handle 111. As may be seen in FIG. 17, the end 111b preferably is threaded for engaging cooperating threads on the head or end member 114. The end member 114 is provided with a transverse slot 114a and a longitudinal passage 114b. The slot 114a has an open end through which a slide fastener tab is adapted to extend. A pin 115 is disposed within a chamber 114c in member 114, and the pin 115 is adapted to be slidably received within the passage 114b. The pin 115 is adapted to extend through the opening in the slide fastener tab of the zipper in the manner previously described in connection with the other modifications. The pin 115 is provided with an enlarged portion 115a which acts as a guide for the pin 115 within the chamber 114c. The enlarged portion 115a is also adapted to be engaged by one end of a compression spring 116 which is also disposed within the chamber 114c. The opposite end of the spring 116 engages the end wall of the chamber 114c.

The tubular member 112 is adapted to rotate on the handle portion 111a between the positions shown in FIGS. 17 and 18. As may be seen in FIG. 19, the tubular member 112 is provided with a cam surface 112a which extends between a shoulder 112b and a shoulder 112c. The rear end 115b of pin 115 is adapted to engage the inclined cam surface 112a and is held thereagainst by the compression spring 116. The shoulders 112b and 112c on member 112 control the extreme positions of rotation of the member 112.

For example, in operating the device 110, the member 112 is rotated to the position shown in FIG. 17 with shoulder 112c engaging the pin 115. With the parts in this position, the device 110 is in open position ready to receive a slide fastener tab within the slot 114a. After the slide fastener tab has been inserted in the slot 114a, with the opening in the slide fastener tab in alignment with the pin 115, the member 112 is rotated to the position shown in FIG. 18, whereby the cam surface 112a engages the end 115b of pin 115, causing the compression spring 116 to be compressed and forcing the pin 115 through the opening in the slide fastener tab to lock it to the device 110. At this time, the shoulder 112b will engage the pin 115 as shown in FIG. 18. The spring 116 being under compression, applies a force to the pin 115 which acts against the cam surface 112a and the friction between this cam surface and the end 115b of pin 115 maintains the device 110 in closed position. To open the device 110, the operator rotates the member 112 in reverse direction to the position shown in FIG. 17, at which time the slide fastener tab of the zipper is free to be removed from the slot 114a.

Referring to FIGS. 20–25, there is shown a further modification of the invention. The slide fastener actuating device 120 is provided with a handle 121 of rigid or semi-rigid rod-like construction. The handle 121 may be made of any suitable material such as metal or plastic, as mentioned above. The end 121a of handle 121 preferably is threaded and is adapted to have secured thereto a head or end member 122. The member 122 is provided with a transverse passage 122b which is adapted to receive a liner 123. The lower end of the liner is provided with an open-ended slot 123b within which the slide fastener tab 19 is adapted to be received. A sleeve 124 extends around the sides of the lower end of member 123 and is secured in the head member 122.

The liner 123 provides a chamber for a plunger 125 which has an enlarged head 125a adapted to engage the internal shoulder 123a within member 123. The plunger 125 is adapted to be biased to the down position shown in FIG. 20 by means of a compression spring 126 which is held in position by means of a screw member 127 secured in the upper end of member 122. As may be seen in FIGS. 17 and 18, the head 114 is provided with a permanent magnet 118 positioned at the closed end of slot 114a. The permanent magnet functions to draw the slide fastener tab 19 into the open end slot 114a. A plug 119 retains the magnet 118 in place.

A pin member 128, which is adapted to extend through the opening 19a in the slide fastener tab member 19, FIG. 23, is carried by a slide member 129 which in turn is provided with a bearing member 129a adapted to slide on the portion 121c of handle 121. The handle 121 is provided with a shoulder 121b which provides an end wall for the chamber 122a in member 122. The chamber 122a houses the member 129 and a compression spring 130 which is adapted to engage the shoulder 121b and the member 129 to force the latter toward the end 121a of handle 121. As may be seen in FIGS. 20 and 21, the slide member 129 projects through a slot 122c in the side wall of the chamber 122a.

The member 122 is provided with a passage 122d which is adapted to receive the pin 128. The passage 122d is positioned in alignment with a passage 124a in member 124 and a corresponding passage 123c in member 123, FIG. 25. Thus, the pin 128 is adapted to extend through passages 122d, 124a and 123c when the device 120 is in closed position as shown in FIG. 22. It will be noted that the passage 123c extends transversely of the slot 123b.

Referring to FIGS. 20 and 21, the slide fastener tab 19 is positioned in the outer end of the open end slot 123b preparatory to being inserted. The slide fastener tab 19 engages the lower end of the plunger 125 in this position. The plunger 125 holds the pin 128 out of the slot 123b. When the slide fastener tab 19 is moved against the end of the plunger 125 and the spring 126 compressed, the plunger 125 is caused to move upwardly, as viewed in FIGS. 20 and 21. When the opening 19a in the slide fastener tab 19, FIG. 23, moves into alignment with the pin 128, the latter is forced through the opening 19a by the compression spring 130. Thus, the pin 128 cooperates with the open end slot 123b to lock the slide fastener tab 19 to the device 120. This locked position is maintained during either push or pull movement of the device 120 during actuation of the slide fastener to open or close the zipper as desired.

To release the slide fastener tab 19 from the device 120, the slide member 129 is moved to the right as viewed in FIG. 22, whereby the pin 128 is withdrawn from the opening 19a in the slide fastener tab 19. The spring 126 causes the plunger 125 to move outwardly until the head 125a engages the shoulder 123a as shown in FIGS. 20 and 21. This causes the slide fastener tab 19 to be ejected from the slot 123b and the plunger 125 holds the pin 128 in the retracted position shown in FIG. 20. The various parts of the device 120 are shown separately in the exploded view in FIG. 25 for clarity.

In the preferred embodiment of FIGS. 20–25, the plunger 125 comprises a permanent magnet and is adapted to aid in drawing the slide fastener tab 19 into the open end slot 123a in the manner previously described in connection with FIGS. 8 and 17. It will be understood that the liner 123 and the head 122 are made of non-metallic material, either plastic or metal as may be desired.

From the foregoing, it will be seen that each of the embodiments described and illustrated herein includes pin means adapted to extend through the opening in the slide fastener tab and the pin means cooperates with transverse slot structure to lock the slide fastener to the slide-fastener actuating devices disclosed herein. Each of the slide-fastener actuating devices includes mechanism for releasably locking the slide fastener to the devices so that the devices may be pushed or pulled as may be required to open or close the zipper or to free the zipper when it is in "stuck" condition. In each of the modifications, the slide fastener tab is adapted to be maintained in a position perpendicular to the zipper for ease in operation of the zipper.

It is to be understood that the present invention is not limited to the specific arrangements described and illustrated herein and that further modifications thereof may be made within the scope of the appended claims.

What is claimed is:

1. A device for actuating a slide fastener of the type including a tab having an opening therein comprising
   a handle of rod-like construction having a hollow extension at one end thereof,
   structure at the outer end of said hollow extension forming an open end slot extending transversely of the longitudinal axis of said handle, permanent magnet means positioned at the end of said slot opposite said open end thereof for drawing the slide fastener tab into said open-end slot,
   slide means positioned within said hollow extension,
   compression spring means positioned within said hollow extension and adapted to exert a force in a longitudinal direction on said slide means,
   said slide means having a slot therethrough and an inclined cam surface extending therealong, a cross pin extending transversely through said slot in said slide means, said cross pin having structure adapted to engage said inclined cam surface on said slide means, at least one end of said cross pin extending through the side wall of said hollow extension for manual movement of said cross pin relative to said inclined cam surface on said slide means, and
   pin means carried by said slide means and adapted to extend transversely through said open end slot, said pin means being adapted to extend through the opening in the slide fastener tab and lock the slide fastener tab within said open end slot in a position perpendicular to the longitudinal axis of said handle.

2. A device for actuating a slide fastener according to claim 1 wherein said structure forming said open end slot is carried by said hollow extension.

3. A device for actuating a slide fastener of the type having an opening therein comprising
   a handle of rod-like construction having a tubular extension at one end thereof,
   a stop member at the outer end of said tubular extension,
   slide means positioned within said tubular extension,
   compression spring means positioned within said tubular extension and adapted to move said slide means longitudinally of said tubular extension,
   projecting structure carried by said slide means and adapted to extend through an opening in the side wall of said tubular extension at a location to maintain said compression spring means under compression,
   pin means carried by said slide means and extending outside of said tubular extension for cooperation with structure carried by said tubular extension of form an open end slot transversely of said tubular extension, said pin means being adapted to extend through the opening in the slide fastener to lock the slide fastener within said open end slot, and
   means carried by said tubular extension and adapted to engage said projecting structure on said slide means to press said projecting structure into said tubular extension and release the compression force of said spring on said slide means.

4. A device for actuating a slide fastener according to claim 3 wherein said slide means includes an inclined cam surface at one end thereof, and a second slide means having a corresponding inclined cam surface is positioned adjacent said one end of said first slide means and adjacent one end of said compression spring means.

5. A slide fastener device according to claim 3 wherein said projecting structure carried by said slide means is supported by spring means which is adapted to bias said projecting structure outwardly of said opening in said tubular extension.

6. A device for actuating a slide fastener of the type having an opening therein comprising:
   a handle of rod-like construction,
   a tubular portion on one end of said handle,
   slide means positioned within said tubular portion for movement longitudinally thereof,
   plug means at the outer end of said tubular portion,
   spring means positioned within said tubular portion for biasing said slide means in a longitudinal direction between said plug means and said one end of said handle,
   pin means carried by said slide means, said plug means having at least one passage therethrough for said pin means, said outer end of said pin means being hook-shaped and being so constructed and arranged to extend through the opening in the slide fastener and cooperate with said plug means in maintaining the slide fastener substantially perpendicular to the longitudinal axis of said handle during both push and pull longitudinal movements of said handle, said slide means comprising two sections having mating inclined cam surfaces at the adjacent ends of said sections, one of said sections having an extension adapted to extend through an opening in the wall of said tubular portion to lock said pin means relative to said plug means, said spring means in said tubular portion acting on said sections along the axis of said device, and plunger means extending through the wall of said tubular portion for engaging said extension to unlock the device.

7. A device for actuating a slide fastener of the type having an opening therein comprising:
a handle of rod-like construction,
a hollow portion on one end of said handle,
slide means positioned within said hollow portion for movement longitudinally thereof,
stop means at the outer end of said hollow portion,
spring means positioned within said hollow portion for biasing said slide means in a longitudinal direction between said stop means and said one end of said handle,
pin means carried by said slide means,
said stop means having at least one passage therethrough for said pin means,
said outer end of said pin means being hook-shaped and being so constructed and arranged to extend through the opening in the slide fastener and cooperate with said stop means in maintaining the slide fastener substantially perpendicular to the longitudinal axis of said handle during both push and pull longitudinal movements of said handle,
said slide means including an inclined cam surface,
structure including a mating inclined surface disposed adjacent said first-named inclined cam surface within said hollow portion, and
means extending through the wall of said hollow portion to produce relative movement between said cam surfaces to control movement of said slide means.

8. A device for actuating a slide fastener of the type having an open end therein comprising:
a handle of rod-like construction having a hollow extension at one end thereof,
stop means at the outer end of said extension,
slide means positioned within said extension,
compression spring means positioned within said extension and adapted to move said slide means longitudinally of said extension,
projecting structure carried by said slide means and adapted to extend through an opening in the side wall of said extension at a location to maintain said compression spring means under compression,
pin means carried by said slide means and extending outside of said extension for cooperation with structure carried by said extension to form an open end slot transversely of said extension, said pin means being adapted to extend through the opening in the slide fastener to lock the slide fastener within said open end slot, and
plunger means carried by said extension and adapted to cooperate with said projecting structure on said slide means in releasing the compression force of said spring on said slide means.

9. A device for actuating a slide fastener of the type including a tab having an opening therein comprising:
a handle of rod-like construction having a hollow extension at one end thereof,
structure at the outer end of said hollow extension forming an open-end slot extending transversely of the longitudinal axis of said handle,
slide means positioned within said hollow extension,
compression spring means positioned within said hollow extension and adapted to exert a force in a longitudinal direction on said slide means,
said slide means having a slot therethrough and an inclined cam surface extending therealong,
a cross pin extending transversely through said slot in said slide means, said cross pin having an inclined cam surface engaging said inclined cam surface on said slide means, at least one end of said cross pin extending through the side wall of said hollow extension for manual movement of said cross pin relative to said inclined cam surface on said slide means, and
pin means carried by said slide means and adapted to extend transversely through said open-end slot, said pin means being adapted to extend through the opening in the slide fastener tab and lock the slide fastener tab within said open-end slot in a position perpendicular to the longitudinal axis of said handle.

References Cited

UNITED STATES PATENTS

| | | | |
|---|---|---|---|
| 828,823 | 8/1906 | Maize | 24—241 X |
| 1,182,790 | 5/1916 | Piper | 294—26 X |
| 1,224,921 | 5/1917 | Hadley | 24—241 X |
| 1,454,550 | 5/1923 | Mabry | 24—158 |
| 2,516,657 | 7/1950 | Spendlove. | |
| 2,553,782 | 5/1951 | Orchard | 24—162 |
| 2,570,538 | 10/1951 | Fincher | 294—26 |
| 2,898,141 | 8/1959 | Perryn. | |
| 3,241,205 | 3/1966 | Genin. | |

FOREIGN PATENTS

| | | |
|---|---|---|
| 531,776 | 1/1941 | Great Britain. |

BERNARD A. GELAK, *Primary Examiner.*